(12) United States Patent
Travalgia

(10) Patent No.: US 6,282,721 B1
(45) Date of Patent: Sep. 4, 2001

(54) HEADWEAR WITH SLOTS FOR GLASSES

(76) Inventor: Trina Travalgia, 60 Roland Rd., Revere, MA (US) 02151

( * ) Notice: Subject to any disclaimer, the term of this patent is extended or adjusted under 35 U.S.C. 154(b) by 0 days.

(21) Appl. No.: 09/624,167

(22) Filed: Jul. 24, 2000

Related U.S. Application Data

(63) Continuation-in-part of application No. 09/162,539, filed on Sep. 29, 1998, now Pat. No. 6,115,843.

(51) Int. Cl.⁷ .................................................. A41D 19/00
(52) U.S. Cl. .............................. 2/171; 2/209.13; 351/155
(58) Field of Search ................................ 2/171, 181.6, 172, 2/182.3, 202, 182.8, 209.13, 209.7, 209.3, 195.1; 351/155, 156

(56) References Cited

U.S. PATENT DOCUMENTS

| | | | | |
|---|---|---|---|---|
| 264,574 | * | 9/1882 | Shone | 2/171 |
| 2,993,209 | | 7/1961 | Monahan, Jr. | 2/14 |
| 4,179,753 | * | 12/1979 | Aronberg et al. | 2/10 |
| 4,549,793 | * | 10/1985 | Yoon | 351/156 |
| 4,712,254 | | 12/1987 | Daigle | 2/452 |
| 4,811,430 | | 3/1989 | Janusz | 2/252 |
| 4,852,189 | | 8/1989 | Duggan | 2/452 |
| 4,856,089 | | 8/1989 | Horton | 455/351 |
| 5,092,667 | * | 3/1992 | Bagley | 351/156 |
| 5,117,510 | | 6/1992 | Broussard et al. | 2/209 |
| 5,133,596 | | 7/1992 | Korny et al. | 351/158 |
| 5,278,999 | | 1/1994 | Brown et al. | 2/209 |
| 5,384,605 | * | 1/1995 | Escobosa | 351/123 |
| 5,647,061 | | 7/1997 | Marcus | 2/11 |
| 5,724,119 | | 3/1998 | Leight | 351/158 |
| 5,734,993 | * | 4/1998 | D'Oca | 2/175.3 |
| 5,860,167 | * | 1/1999 | Lizio | 2/209.13 |
| 5,905,560 | * | 5/1999 | Daniel | 351/157 |

\* cited by examiner

*Primary Examiner*—John J. Calvert
*Assistant Examiner*—Kate Moran
(74) *Attorney, Agent, or Firm*—Ernest V. Linek; Banner & Witcoff, Ltd.

(57) ABSTRACT

The present invention relates generally to headwear wearable about the head and ears of a user, and more particularly to an improved headwear construction that can, if desired, easily support a pair of sun glasses or eyeglasses, using open slots, buttonholes, or the like, aligned strategically on each side of the headwear, thereby providing an entrance for the arm(s) of a pair of sun/eyeglasses that will be positioned behind the headwear.

20 Claims, 2 Drawing Sheets

BUTTON HOLE

BUTTON HOLE

HEADWEAR WITH SLOTS FOR GLASSES

CROSS-REFERENCE TO RELATED APPLICATION

This application is a continuation-in-part of application Ser. No. 09/162,539, filed Sep. 29, 1998, now U.S. Pat. No. 6,115,843, the disclosure of which is hereby incorporated herein by reference.

BACKGROUND OF THE INVENTION

1. Field of the Invention

The present invention relates generally to headwear wearable about the head and ears of a user, and more particularly to an improved headwear construction that can, if desired, easily support a pair of sun glasses or eyeglasses, using open slots, buttonholes, or the like, aligned strategically on each side of the headwear, thereby providing an entrance for the arm(s) of a pair of sunglasses or eyeglasses that will be positioned behind the headwear.

2. General Background

There are a number of types of headwear that are commercially available, which cover and fit around a person's head, forehead, and ears to provide warmth and protection from cold weather elements (i.e. hats, headbands, hoods, etc). There are many uses for headwear such as skiing, biking, attending sporting events, any out-door athletic or work activity, etc. In addition, headwear is quite convenient, popular and necessary in that they help keep a person warm & protected, they are also small, lightweight, easy to carry, pack away and wear. For these reasons, headwear is widely used. However, all of the uses mentioned in this paragraph may also demand the wearing of a pair of eyeglasses or sunglasses for corrective vision or bright light protection. However, it is very difficult and often uncomfortable to wear both ear-covering headwear and a pair of sunglasses or eyeglasses at the same time.

Many people must wear doctor prescribed eyeglasses in order to see adequately and safely, for example, it is very dangerous to ski down a trail or ride a bike without being able to read signs or see ahead well enough to maneuver when necessary and/or quickly in order to avoid disaster. A large percentage of the world's population wears prescription eyeglasses but cannot conveniently or comfortably do so while wearing fully enveloped headwear. Even more people wear sunglasses on a bright day in order to see through blinding sunlight but again, cannot.

Fully enveloped headwear is designed to cover the head, forehead and at least the top half of the ears which makes it nearly impossible to properly fit a pair of glasses over the wearer's ears. Eye/sunglasses are made to fit over the top and around the back of a human ear but with headwear on there is no simple means to access the ears. An eyeglass or sunglass wearer can however, with a headwear on, force the arms of the glasses up, in, and around to fit the ear but this often causes the headwear to fold back, thereby exposing the ears to the cold weather elements, which in turn, defeats the main purpose of headwear and makes for a very uncomfortable, often painful, configuration along with no means of security for the glasses.

Thus there is a need for a simple straight-forward headwear construction that can cover the ears of the wearer, at least partially, more preferably fully, and which further includes optional means to encompass and support a pair of the all important sunglasses or eyeglasses, particularly in a manner that can be quickly, easily, and comfortably accomplished.

3. Description of the Prior Art

It is know to support sunglasses or eyeglasses on apparatus that fits on the head of a wearer such as headbands, helmets, masks or earmuffs. Combination headwear and sunglasses or eyeglass apparatuses are known to provide a more secure and easy way of wearing glasses. However, none of the following items is an attempt at combining sunglasses or eyeglasses support means with headwear for the purpose of having cold winter weather protection & warmth with an option of so easily wearing much-needed sun or eyeglasses. For example, see:

Leight, U.S. Pat. No. 5,724,119, which discloses an earmuff-eyeglass combination that consists of an earmuff assembly and an eyeglass assembly, where the eyeglass assembly includes an eyeglass with opposite sides and a pair of temple bar devices, and where each temple bar device has a rear end pivotally mounted on said earmuff assembly and has a front end coupled to a corresponding side of said eyeglass, wherein: each of said temple bar devices includes a plurality of bars, including a first bar having a rear end pivotally connected to said earmuff assembly and having a front end lying forward of said rear end, and a second bar having a rear end pivotally connected to said front end of said first bar and having a front end which lies forward of said second bar rear end and which is pivotally coupled to a corresponding side of said eyeglass, whereby to enable adjustment of the forward-rearward position of the eyeglass.

Marcus, U.S. Pat. No. 5,647,061, which discloses a headgear having eyeglass securing means consisting of a continuous band of elastic material having an inner surface intended for circumferential fitting engagement with the head of a wearer and an outer surface opposite said inner surface, said inner and outer surfaces being defined by top and bottom edges; and eyeglass securing means for selectively attaching a pair of eyeglasses worn by said wearer to said band, said eyeglass securing means comprising an elongated strip of flexible material having a first end fixed to said band, and a second end releasably attachable to said band, said strip having a length sufficient to form a loop about a nose bridge of said eyeglasses when said second end is attached to said band, said strip including a hook and catch fastener portion at said second end, and said inner surface of said band including a hook and catch fastener receiving portion aligned above said first end for releasable attachment of said second end thereto.

Forsyth, U.S. Pat. No. 5,278,999, which discloses a combined ear and eye protection device consisting of a pair of ear muffs each having an exterior housing and interior sound absorbing material, each said muffs adapted to fit over one ear of the user; a headgear adjustably attached at each end to one of said ear muffs and adapted to fit over the head of the user; and eye protector glasses having a front frame and two side templates wherein each template is attached at one end to said frame and pivotally attached at its other end to the interior of said ear muffs and said frame being removable from at least a portion of each said template permitting the substitution of alternate frames, said templates including means for horizontal adjustment independently of said pivotal attachment to said ear muffs; wherein each ear muff includes a top frontal quadrant and said pivotal attachment of said templates being located within said quadrant.

Holmes, U.S. Pat. No. 5,133,596, which discloses an eye and hearing protection member consisting of means for protecting eyes and means for protecting hearing, said eye protecting means being selected from the group consisting of a goggle and a spectacle, each one including a frame means and at least one lens affixed thereto, the frame means including integrated reinforcement means whereby said reinforced frame means remains substantially rigid and without substantial deformation during normal use of the safety unit; the hearing protection means including a pair of earcups; a pair of arm members adapted to cooperate with and extend from the respective opposed temple regions of the reinforced frame means by way of mutually complimentary engageable coupling means of releasable snap-fit type, which coupling means are disposed at one end of the respective arm members and at laterally spaced positions of the reinforced frame means, which arm members carry at their ends a respective one of the earcups and where the arm members resiliently react against the substantially rigid frame means to hold the earcups to the side of a wearer's head in use and which receive the earcups in a manner to provide adjustability on an inclined plane to account for facial asymmetry, the mounting of the lens being isolated from the resilience of the arms by the provision of the frame reinforcement means.

Brousseau, U.S. Pat. No. 5,117,510, which discloses a headgear construction for supporting a flashlight consisting of (a) a circular headgear having inner and outer wall surfaces and upper and lower band edges; (b) at least the outer wall surface having a pair of buttonholes extending generally vertically between the upper and lower band edges and spaced along the band from front to rear, including a forwardly positioned buttonhole and a rearwardly positioned buttonhole which are closely spaced apart so that a small flashlight can be supported by the headgear when inserted respectively through the pair of buttonholes; and© the headgear having a portion generally between he forward and rear button holes that defines a strip of headgear material that covers and engages the flashlight along its length during use.

Bagley, U.S. Pat. No. 5,092,667, which discloses a combination eyeglass retainer and ears protector, comprising an adjustable two-piece headgear having tubular members for receiving and holding the temples of a pair of eyeglasses threaded there through, and wherein the tubular members hook over the user's ears when the eyeglass retainer is placed in operable position on a user's head, and wherein the eyeglasses are firmly retained in position due to the tubular members being snugly placed between the headgear pieces and the user's head.

Horton, U.S. Pat. No. 4,856,089, which discloses a combined eye covering and ear covering assembly consisting of a resilient, hard, stiff, non-elastic, arcuate, non-encircling elongated head band structure which is adapted to be positioned at an angle above the eyes and across a forehead of a wearer and which is constructed to extend only part way around the head of a wearer from one ear forwardly across the forehead to the other ear and not behind the head or over the top of the head of the wearer, said band structure having a hard, inelastic center portion which is adapted to be positioned over the middle of the forehead of the wearer and above the nose of the wearer and first and second hard, inelastic, but flexible end portions each having a free end which is arranged to extend to a position adjacent one ear, each end portion including a band made of rigid but flexible spring material and coupled at an inner end thereof, opposite said free end, to said center portion of said band structure, first and second ear coverings mounted, respectively, to one of said band structure end portions adjacent said free end thereof, adjusting means for adjusting the position of said ear coverings on said band end portions, said center portion of said band structure including rigid mounting means centrally located over the wearer's forehead for mounting an eye covering, and an eye covering mounted to said mounting means.

Duggan, U.S. Pat. No. 4,852,189, which discloses a headgear structure consisting of a continuous elastic headgear having moisture absorptive properties and textured to present a larger plurality of upstanding fibrous loops, the improvement which compresses a rimless relative thin one-piece preformed flexible thermoplastic eyeglass member of generally wraparound configuration having a central body portion and integral rearwardly directed tapered wing portions to substantially entirely shield the eyes from sun rays and the intrusion of foreign objects, and means adhesively secured to the body and wing portions of said eyeglass member along the upper inner marginal portions thereof and presenting fibrous hooks outstanding therefrom for cooperative releasable engagement with the upstanding loops of the textured continuous elastic headgear along the outer exposed surface thereof, said eyeglass member thereby being readily invertible by rotation through an angle of about 180 degrees from an active line of sight position on said headgear depending downwardly thereon to an active out of line sight position on said headgear extending upwardly thereon in releasable engagement therewith.

Janusz, U.S. Pat. No. 4,811,430, which discloses an eye shield and headgear combination, wherein a frameless optical eye shield is used with a moisture-absorbent headgear. The eye shield is a transparent sheet having one of a pair of loop-and-pile fasteners adhered to the upper margin of its outer surface. The headgear has a pocket attached to its inner surface and also the other of said fasteners adhered to the lower margin of its inner surface. The eye shield may be stored in the pocket when it is not in use, and is attached to the headgear with the fasteners when it is in use.

Daigle, U.S. Pat. No. 4,712,254, which discloses a headgear and eyepiece combination, comprising a headgear element which is receivable on the head of a wearer and has an open pocket formed therein, an eyepiece which is receivable in the pocket and a mounting assembly for mounting the eyepiece on the headgear element. The eyepiece is mounted on the headgear element so that it is alternatively positionable in a retracted first position wherein it is received in the pocket for use of the device as a conventional headgear or an operative second position wherein it extends from the headgear element for use of the device as a headgear and eyeglass combination.

Monahan, U.S. Pat. No. 2,993,209, which discloses a diving face mask structure consisting of a hollow casing having a transparent front and wall secured thereto and an open rear end, the rear edges of said casing being dimensioned and shaped to be adapted to fit over the eyes and nose and conform to the contours of the face of a wearer in fluid sealing engagement therewith, a pair of aligned openings formed on the side walls of said casing adapted to receive the temples of a pair of glasses of a wearer adjacent the frames, a hollow rearwardly extending tube having its forward end secured to said casing about the periphery of each opening in fluid seating engagement with said casing, the free rear ends of said tubes being sealed, said tubes being of sufficient length and diameter to receive the temples of a pair of glasses positioned within the casing and worn by the wear of said mask.

Each of the patents described above suffers certain drawbacks, including the following: most fail to teach or suggest cold weather headwear which encircles the head, including the forehead and ears. More importantly, none of these patents provide means for wearing a pair of conventional sunglasses or eyeglasses with headwear, in a manner that is easy to use.

Accordingly, the headwear of the present invention is designed to keep the user's head, forehead and ears warm and also provides convenient means to accept and retain a pair of sunglasses or eyeglasses comfortably, effortlessly and securely. This new and useful invention will significantly enhance a user's performance and enjoyment while being able to wear both warm & protecting headwear and a pair of much needed eye/sunglasses.

SUMMARY OF THE INVENTION

As used herein the term "headwear" refers to an article of clothing which can be worn on the head of a user and covers at least a portion thereof, preferably including the forehead and at least the upper portion of the ears. By upper portion of the ears is meant that portion where sunglass or eyeglass arms rest on the ears. The headwear of the present invention advantageously covers a majority of the user's head, and if such headwear extends over the eyes, it includes slots or spaces sufficiently sized to permit the user to see out of the article of clothing. Headwear as used herein includes, but is not limited to, ski caps of various forms and materials, bandanas, ski masks, head bands, and similar articles of clothing.

As described herein, it is an object of the present invention to provide cold weather headwear with means and option for reasonably fitting a pair of sun or eyeglasses that is simple to apply and which does not require the use of excess material, adhesives, straps, tools of even more than a single hand.

It is another object of the present invention to provide headwear with means and option of reasonably fitting and supporting a pair of sun or eyeglasses there through, which is greatly economical to produce.

It is a further object of the present invention to provide headwear with means and option for fitting a pair of sun or eyeglasses there through, which may be worn by a large percentage of the population.

Moreover, the present invention to provide headwear with means and option for fitting a pair of glasses there through will allow users to perform better and more importantly; safely.

In accordance with the preferred embodiment of the present invention: stretchable fleece-like headwear is provided with two slots or buttonholes, one on each side, aligned strategically at temple's location. The slots (or buttonholes) can have any desired shape, e.g., oval, tear drop, square, round, diamond, triangle, etc., so long as they are sized sufficiently so that any size sunglass or eyeglass arms will slide through with only minimal resistance.

To use the headwear of the present invention, the user should simply stretch, fit, and position the improved headwear over the head as usual. Then slide the arms of a pair of sun glasses or eyeglasses back into the buttonholes and behind the ear(s) to rest as normal. To remove, simply pull the sunglasses or eyeglasses forward and away from the face as normal; remove headwear by pulling upward from the head.

BRIEF DESCRIPTION OF THE DRAWINGS

The nature and mode of operation of the present invention will now be more fully described in the following detailed description of the preferred embodiments taken with the accompanying drawing figures, in which.

DETAILED DESCRIPTION OF THE PREFERRED EMBODIMENTS

Figure 1:
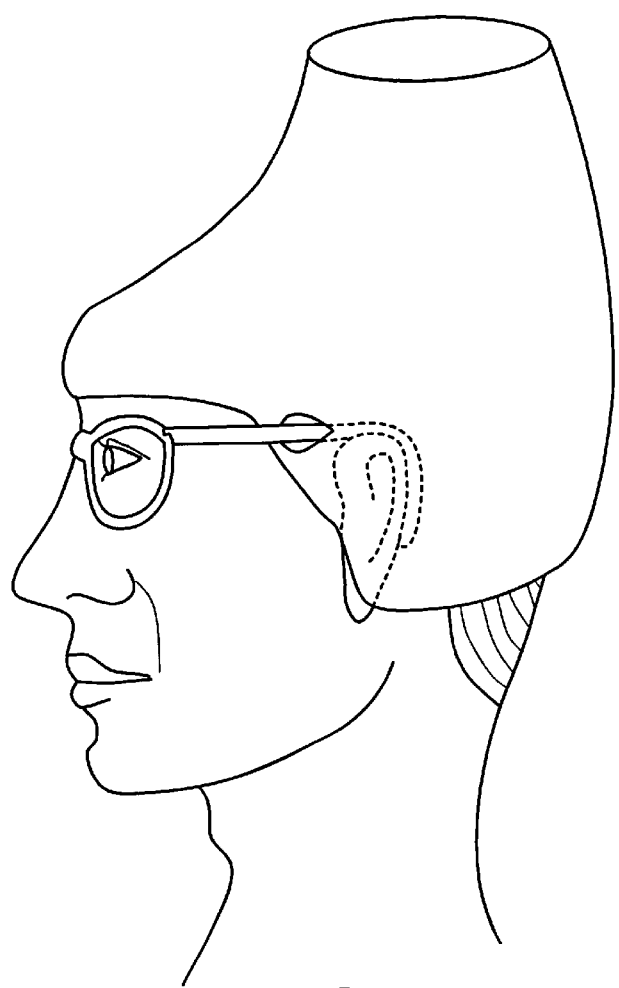
FIG. 1 is a side perspective view of one embodiment of the improved headwear of the present invention with a pair of sunglasses or eyeglasses worn by a wearer.
Figure 4:
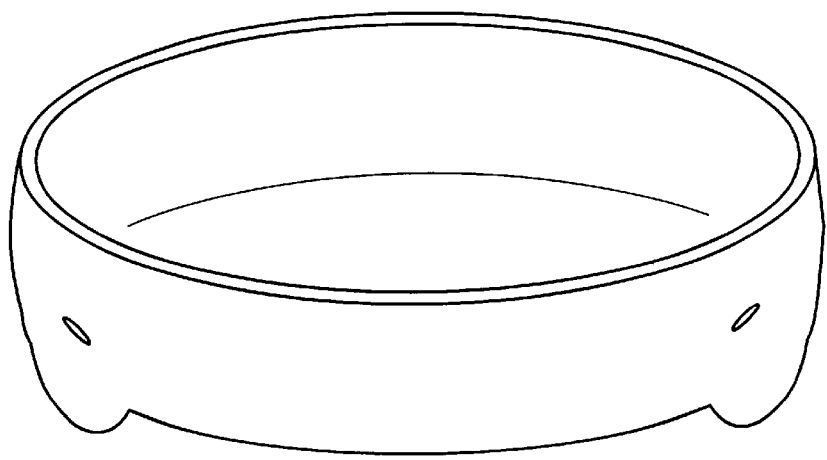
FIG. 4 is a frontal perspective view of yet another embodiment of the improved headwear of the present invention.
Figure 2:
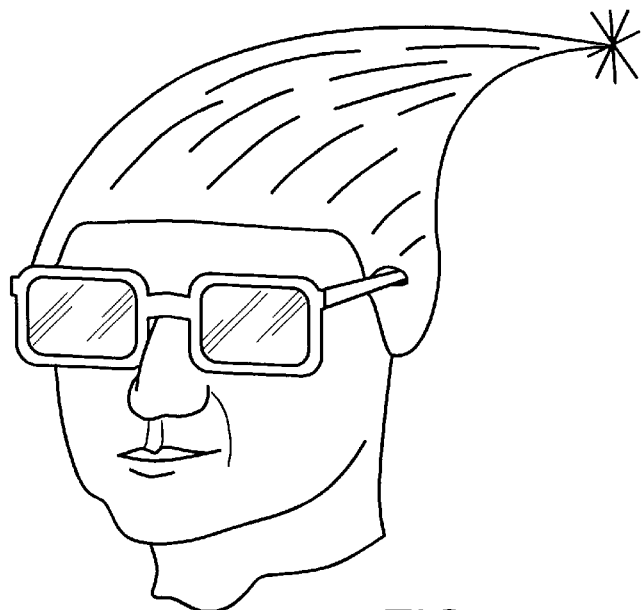
FIG. 2 is a frontal perspective view of another embodiment of the improved headwear of the present invention with a pair of sunglasses or eyeglasses worn by a wearer.
Figure 3:
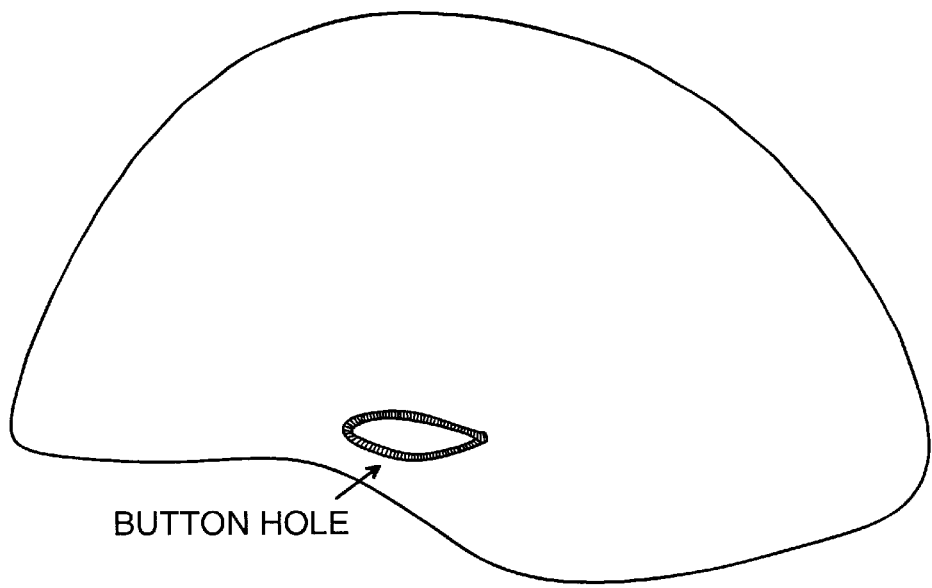
FIG. 3 is a side perspective view of yet another embodiment of the improved headwear of the present invention.
Figure 3A:
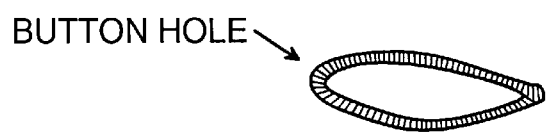
FIG. 3A is a close-up view of one embodiment of the button hole used in the headwear of the present invention.

Referring to FIGS. 1, 2, 3 and 4, various embodiments of types and shapes of headwear of the present invention are illustrated. FIGS. 1, 2 and 3 show various styles of ski caps, while FIG. 4 shows a headband form of the headwear. These styles are not meant to be limiting, rather they illustrate that almost any shape of material may be employed to cover the head of the user.

Each headwear embodiment is advantageously fabricated from a fleece-like material which is stretchable and comprises continuous top and bottom generally parallel edges and which define an inner surface intended for circumferential fitting engagement with the head of the wearer and outer surface opposite inner surface.

As illustrated, the headwear of the present invention has two slots or buttonholes, one on each side, sewn-in and aligned on both sides at temples location that create an opening that is sized large and long enough to generously welcome the arms of a pair of sun or eyeglasses.

Referring to FIGS. 1 and 2 but more particularly FIG. 1, the improved headwear is shown with a pair of sunglasses or eyeglasses combined on a person's head. The ends of each arm of the glasses are inserted into and behind the headwear via the slots or buttonholes on the headwear. The slots or buttonholes are sized to welcome the sunglass or eyeglass arms easily and without force or difficulty. The arm(s) of the glasses slide behind the headwear and curve behind the ear(s) as normal and sit upon the bridge of the nose as normal.

Referring to FIG. 2, the improved headwear is shown combined with a pair of glasses on a wearer's head from a frontal perspective. The headwear is encircled around the head with a pair of sunglasses or eyeglasses fitted through the buttonholes, resting the front frame of the glasses upon the bridge of the nose as normal. From this perspective the forehead, back of the head and ears are covered behind the headwear as well as part of the arms of the sunglasses or eyeglasses, which are behind the headwear and curved around the ears.

Referring to FIGS. 3 & 4, the improved headwear is displayed without a pair of sunglasses or eyeglasses or fitted around a head of a wearer. In FIG. 3, the buttonholes are visible from this side view and in FIG. 4, the buttonholes are seen from this frontal view.

A wearer of headwear of the present invention can quickly and easily wear a pair of sun or eyeglasses with the improved headwear by sliding the arms of the sunglasses or eyeglasses through the buttonholes and adjusting the glasses upon the bridge of the nose as normal. To remove sunglasses or eyeglasses and headwear, pull the glasses forward away from the face as normal so that the arms are dislodge from behind the ears and out from behind the buttonholes and headwear then pull the headwear upward from head.

Other materials that may be used to form the headwear of the present invention are well-known in the art; for example, the headwear can be formed as a sandwich from one or more materials having an elastomeric core and a fabric on each side of said core. The core can be, for example, neoprene, rubber, or the like.

The outside fabric can advantageously be a water repellent, wind breaker or waterproof material such as MYLAR polyester film, nylon, or the like, while the inner fabric is preferably a moisture absorbing material and/or a heat retaining material, such as wool, cotton, flannel, terry cloth, Malden Mills' Polartec® fleece, or the like. If added warmth is desired, insulating materials can be used —such as 3M's Thinsulate®, or like materials. The skilled artisan can readily fabricate the headwear of the present invention using these and other readily available materials.

Outside fabrics can be chosen to reflect the current fashions of the intended users, particularly downhill skiers, who commonly wear brightly colored garments, in neon, fluorescent, and similar vivid colors. Snowboarders on the other hand, tend to forego the bright colors favored by downhill skiers, and the outer fabrics for these users would include camouflage patterns, black, and earth tone colors. Advertising (e.g., ski slopes, manufacturers, company logos etc.) can be included on the outside fabric if desired, and if permission is granted. If desired, the headwear can be made reversible, allowing the wearer the option of showing different outer materials.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. An improved cold weather headwear item with means to accept the arms of sunglasses or eyeglasses while said sunglasses or eyeglasses are in position for use at the weaxer's eyes; said headwear comprising a quantity of material sized sufficiently to cover at least a portion of the head, forehead, and at least the upper portion of the ears of a user.

2. The headwear of claim 1, wherein the quantity of material is sized sufficiently to cover the entire ears of the user.

3. The headwear of claim 1, wherein the arm accepting means comprises two slots aligned on opposite sides of the headwear.

4. The headwear of claim 1, wherein said headwear is adapted to encircle the head of the user wherein said headwear conforms closely to the head, forehead, and ears of the user.

5. The headwear of claim 1, wherein the headwear material comprises a stretchable material fashioned as a sandwich from at least one material having an elastomeric core and a fabric on each side of said core.

6. The headwear of claim 5, wherein the elastomeric core is fashioned from neoprene.

7. The headwear of claim 5, wherein the elastomeric core is fashioned from rubber.

8. The headwear of claim 5, wherein the fabric on at least one side is polyester film.

9. The headwear of claim 5, wherein the fabric on at least one side is nylon.

10. The headwear of claim 5, wherein the fabric on at least one side is wool.

11. The headwear of claim 5, wherein the fabric on at least one side is cotton.

12. The headwear of claims 5, wherein the fabric on at least one side is fleece.

13. The headwear of claim 5, wherein the fabric on at least one side is flannel.

14. The headwear of claim 5, wherein the fabric on at least one side is a neon color.

15. The headwear of claim 5, wherein the fabric on at least one side is an earth tone color.

16. The headwear of claim 5, wherein two fabrics suitable for use as the outer fabric are employed on each side, making the headwear reversible.

17. The headwear of claim 16, wherein the fabric on at least one side includes advertising indicia.

18. The headwear of claim 16, wherein the fabric on at least one side is a neon color.

19. The headwear of claim 16, wherein the fabric on at least one side is an earth tone color.

20. An improved cold weather headwear item with means to accept the arms of sunglasses or eyeglasses; said headwear comprising a quantity of material sized sufficiently to cover at least a portion of the head, forehead, and at least the upper portion of the ears of a user, wherein the arm accepting means comprises two sewn-in buttonholes placed at the temples, said buttonholes being sized sufficiently to accept the arms of a pair of sunglasses or eyeglasses.

\* \* \* \* \*